United States Patent [19]

Matto

[11] 3,905,191
[45] Sept. 16, 1975

[54] GAS TURBINE ENGINE WITH EFFICIENT ANNULAR BLEED MANIFOLD

[75] Inventor: Lawrence R. Matto, Shelton, Conn.
[73] Assignee: Avco Corporation, Stratford, Conn.
[22] Filed: Apr. 10, 1974
[21] Appl. No.: 459,703

[52] U.S. Cl. ............................ 60/39.07; 60/39.09 P
[51] Int. Cl.² .......................................... F02C 3/12
[58] Field of Search ................... 60/39.09 P, 39.07; 415/144, 145, 121 R; 55/306

[56] References Cited
UNITED STATES PATENTS

| | | | |
|---|---|---|---|
| 2,934,094 | 4/1960 | Szydlowski | 60/39.07 |
| 2,986,231 | 5/1961 | Hellstrom | 415/144 |
| 3,250,069 | 5/1966 | Rhoda | 415/144 |
| 3,329,377 | 7/1967 | Peterson et al. | 60/39.09 P |
| 3,777,489 | 12/1973 | Johnson et al. | 415/144 |

FOREIGN PATENTS OR APPLICATIONS
1,142,879  9/1957  France .................................. 55/306

Primary Examiner—C. J. Husar
Assistant Examiner—Robert E. Garrett
Attorney, Agent, or Firm—Charles M. Hogan; Irwin P. Garfinkle; Gary M. Gron

[57] ABSTRACT

A gas turbine engine has an annular bleed manifold for cabin pressurization and other purposes. The bleed manifold is positioned at a point intermediate the ends of the engine combustor to utilize the highest available engine pressure for these purposes. A deflector in the form of a continuous band or a series of chutes permits entry of air through openings into the manifold but deflects particulate matter away from the opening thereby insuring clean cabin pressurization air.

6 Claims, 5 Drawing Figures

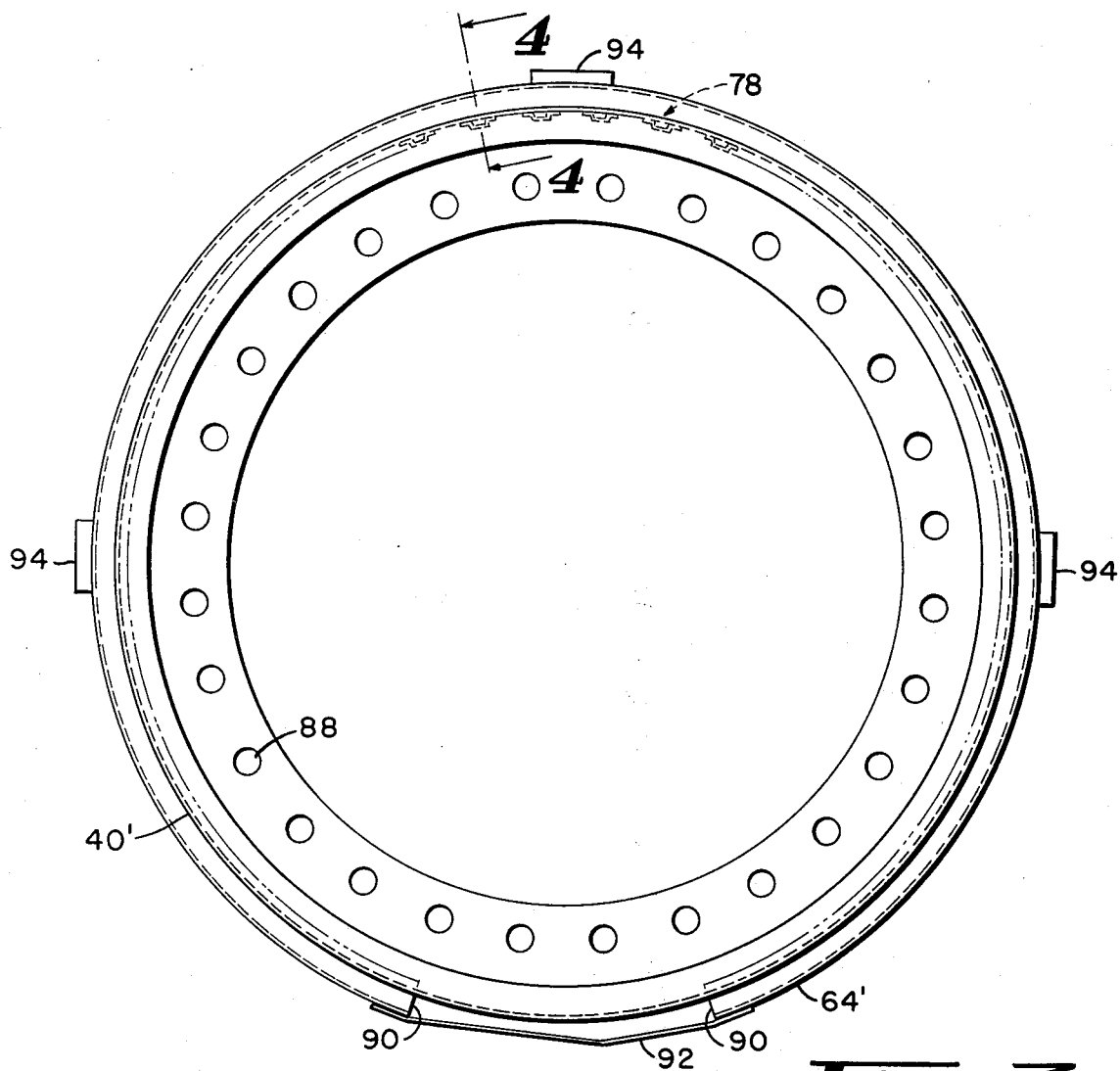
Fig. 3
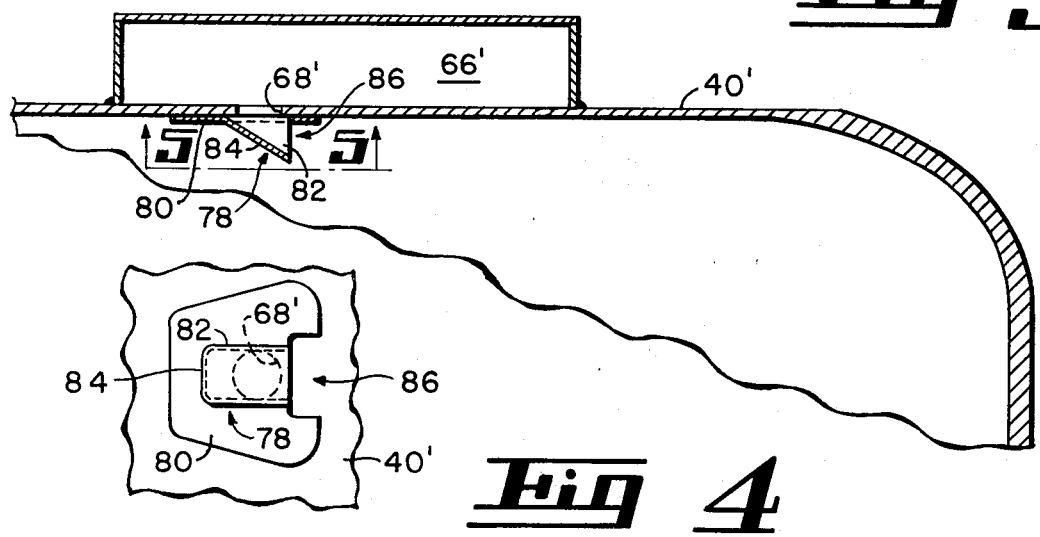
Fig. 4
Fig. 5

GAS TURBINE ENGINE WITH EFFICIENT ANNULAR BLEED MANIFOLD

When fan-jet gas turbine engines are to propel passenger aircraft they are frequently used as a source of cabin pressurization air. The gas turbine engine, as a part of its basic cycle, takes ambient air and pressurizes it to a level substantially above atmospheric pressure, e.g. 180 p.s.i.a. at sea level. Since there is always an excess of air necessary to sustain combustion, it is extracted for pressurization.

In practice it is a simple matter to provide a distribution manifold to bleed pressurized air from the compressor and connect this to the cabin pressurization system. Most frequently the air is extracted from an intermediate stage of the compressor or immediately adjacent the last rotating stage. This location, however, while providing sufficient air at sea level or for moderate altitudes, may provide marginal pressurization at cruising altitudes of between 30,000 and 40,000 ft. The reason for this is that density of air at these altitudes is reduced to the extent that a much lower pressure output is available from the compressor. At this point when the cabin pressurization needs are the greatest the engine has the least pressure available. Under certain circumstances this would result in an unacceptable margin of cabin pressurization air.

The above problems are solved by a gas turbine engine of the above general type in which a bleed manifold is provided on at least a portion of the periphery of a housing surrounding a combustor for the engine so as to place it at a maximum pressure location. A series of openings in the housing connect the interior of the chamber to the housing at this point. A deflector is provided around the openings so as to permit entry of air but deflect particulate matter away from the openings.

The above and other related features of the present invention will be apparent from a reading of the following description of the disclosure shown in the accompanying drawings and the novelty thereof pointed out in the appended claims.

In the drawings:

FIG. 3 is a cross-sectional view of a gas turbine engine employing an alternate embodiment of the present invention;

FIG. 4 is a fragmentary enlarged longitudinal section view of the gas turbine engine shown in FIG. 3, taken on line 4—4; and FIG. 5 is an enlarged fragmentary view of the distribution manifold of FIGS. 3 and 4, taken on line 5—5 of FIG. 4.

Figure 1:
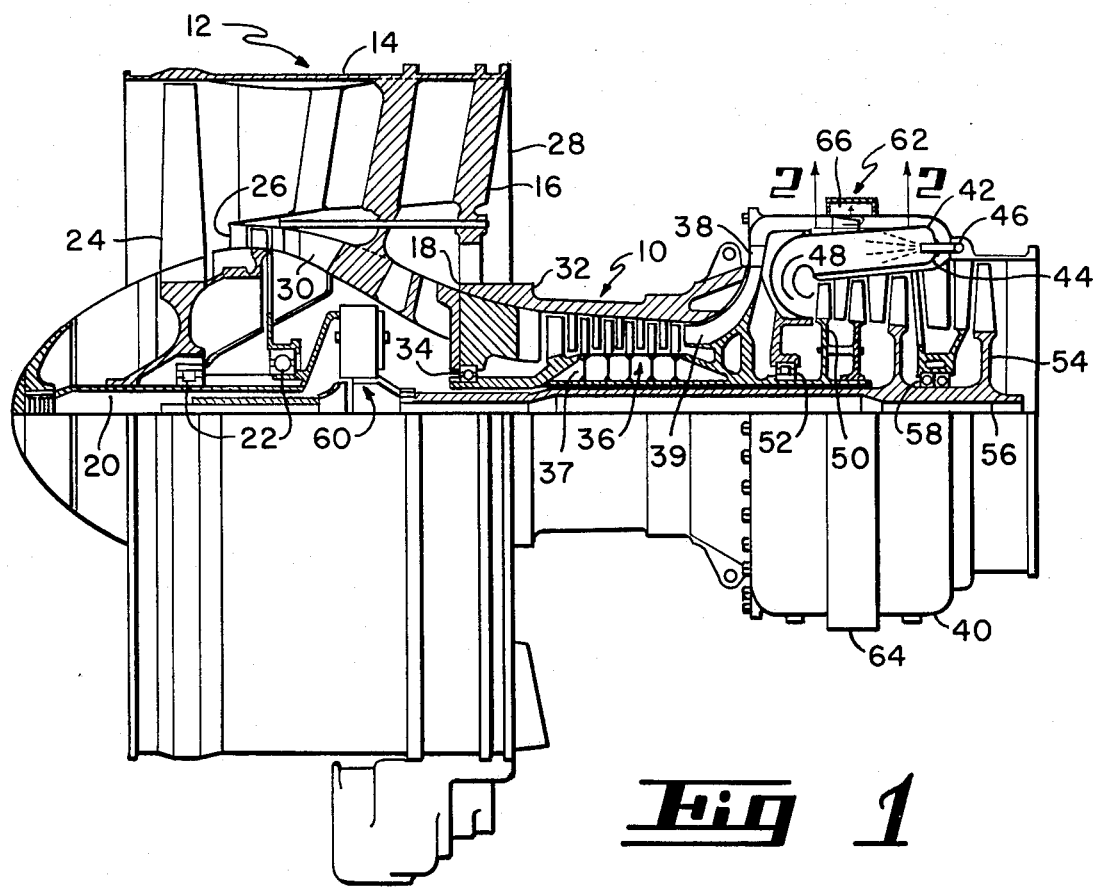
FIG. 1 is a simplified longitudinal section view of a gas turbine engine having a bleed manifold embodying the present invention.

Referring to FIG. 1 there is shown a gas turbine engine comprising a main gas generator 10 connected to and driving a fan module 12. The fan module 12 comprises an outer annular housing 14 and an integral frame structure 16 forming a support for the forward end of the gas generator through a mounting flange 18. This frame structure is particularly described in co-pending patent application entitled "Fan Engine Mounting," Ser. No. 335,750, filed Feb. 26, 1973, and now U.S. Pat. No. 3,830,058, in the name of R. Ainsworth. The frame structure 16 journals a fan support shaft 20 through bearings 22. A bladed fan rotor 24 and a supercharging stage 26 are mounted to the shaft 22. Rotation of the shaft 20 accelerates air for discharge from a fan outlet 28 to provide a propulsive force and to pressurize air for entry to the core engine through annular inlet passage 30.

The core engine 10 has an outer casing 32 mounted to flange 18. A forward bearing assembly 34 supported by the outer casing 32 journals a compressor rotor 36. Compressor rotor 36 has several axial flow stages 37 and a final centrifugal impeller 39. Rotation of compressor rotor 36 accelerates and pressurizes air for discharge from impeller 39 through a diffuser 38 for further increasing its static pressure. From there the air passes into a housing 40 surrounding an annular combustor 42. The head end 44 of combustor 42 contains fuel injectors 46 (only one shown) that inject fuel into the combustor 42. The fuel is mixed with pressurized air that passes inward through perforations in the combustor wall 42. A suitable device is used to ignite the combustible mixture and the resultant hot gas stream passes forward in a direction opposite to the flow of air from the compressor and is then turned inward and through 180° by a combustor outlet duct 48 for discharge across a compressor turbine rotor 50. Compressor turbine rotor 50 is structurally connected to the compressor rotor 36 and journaled by a bearing assembly 52. Passage of the gas stream across turbine rotor 50 causes it to rotate and thus drive compressor rotor 36. The hot gas stream then passes across a power turbine rotor assembly 54 on an output shaft 56 journaled by bearings 58. Power turbine shaft 56 extends forward through the compressor and turbine rotors to a speed-reduction gear set 60 driving fan input shaft 20 to rotate the fan rotor 24.

When the engine is used to power an aircraft operable at varying heights, the amount of pressure available for airframe bleed purposes is reduced significantly as the aircraft gains maximum altitude. In accordance with the present invention a bleed system, indicated at 62, is incorporated with the engine to maximize the amount of bleed available from the engine.

Figure 2:
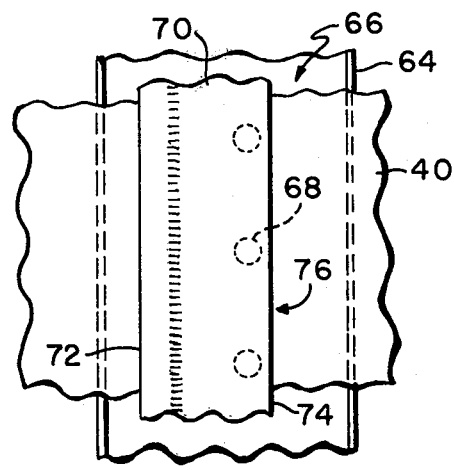
FIG. 2 is an enlarged fragmentary view of the gas turbine engine of FIG. 1, taken on line 2—2 of FIG. 1.

Referring to FIGS. 1 and 2, the bleed system comprises an annular channel-shaped element 64 secured around the periphery of housing 40 to form a chamber 66. As shown particularly in FIG. 2, a series of holes 68 are positioned around housing 40 to connect the chamber defined by housing 40 with chamber 66. A deflector band 70 has an upstream edge 72 secured to the housing 40 upstream of the holes 68 with respect to the direction of flow from the compressor diffuser 38. The deflector ring 70 angles inward from the leading edge 72 to a trailing edge 74 positioned downstream of and radially inward from the holes 68. Air then must pass through an aft facing annular opening 76 and reverse direction before it enters chamber 66.

FIGS. 3, 4 and 5 show an alternate arrangement for the deflectors around the holes. In this case holes 68' in the housing 40' connect with chamber 66'. In place of the deflector ring 70 a defletor chute 78, shown in FIGS. 4 and 5, is provided around each of the holes 68'. Each deflector chute 78 comprises a base 80 suitably secured to the housing 40', as by welding, so that it surrounds the opening 68'. A pair of triangular-shaped side walls 82 and wall 84 extending between the side walls 82 are integrally formed at the base 80 to form an aft facing inlet 86 through which air must pass in a forward direction to enter chamber 66'.

As stated above, the engine combustor 44 has a plurality of fuel nozzles adapted to be positioned through openings 88 in the aft part of housing 42. To avoid the possibility of raw fuel dripping into the bleed chamber 66' the channel-shaped housing 64' has ends 90 terminating short of a complete circle to form a gap at the lower portion of the housing 40'. A strap 92, however, extends between and is structurally secured to the ends of the channel element 64' to help resist its hoop stresses caused by the high pressure bleed air inside of it. Suitable bleed connection openings 94 are positioned at various locations around the periphery of channel element 64' to enable connection to a suitable source.

In operation the air to be bled from the engine is extracted from the chamber defined by housing 40. In this chamber air is passing in an aft direction for utilization by the combustor 42. The pressure in this chamber is at generally the maximum level attainable in the gas turbine engine. By extracting the air at this point the possibility of insufficient air pressure for airframe utilization is minimized if not eliminated. For the arrangement of FIGS. 1 and 2 the deflector ring 70 causes any particulate matter passing into the engine to be deflected away from the holes 68. The air, however, since it has a lower density, is able to change direction toward the upstream end and enter the chamber 66 via the holes 68. The arrangement of FIGS. 3–5 acts in a similar manner since the chutes 78 deflect particulate matter away from the holes 68' while permitting the air to enter the holes 68' via individual inlets 82.

Whether or not the air is being bled from chamber 66 it is maintained at a relatively high pressure. Terminating the ends of the chambers 66 short of the bottom of the engine eliminates the chance of raw fuel passing into the bleed system. At the same time, however, the band 92 interconnects the ends of the channel element to maximize its ability to resist hoop stresses. It should be apparent that the termination of the end of the channel element 64' is equally applicable to the arrangements of FIGS. 1 and 2.

While several preferred embodiments of the present invention have been described, it should be apparent to those skilled in the art that it may be practiced in other forms without departing from its spirit and scope.

Having thus described the invention what is claimed as novel and desired to be secured by Letters Patent of the United States is:

1. A gas turbine engine comprising:
an annular outer housing;
a driven compressor journaled within said housing for pressurizing ambient air;
a combustor positioned within said housing downstream from said compressor and receiving the pressurized air therefrom;
means for injecting fuel into said combustor for producing a combustible mixture ignitable to produce a propulsive gas stream;
an annular bleed chamber positioned at said combustor around at least a portion of the periphery of said housing at a position experiencing the maximum pressure for air discharged from said compressor, said housing having openings connecting the interior of said housing to said annular bleed chamber, said annular bleed chamber is defined by a channel-shaped element extending around the periphery of said housing and terminating in ends defining a gap adjacent the bottom of said housing and said housing is imperforate in the area of said gap, thereby minimizing entry of raw fuel into said manifold; and
deflector means positioned over said openings so as to permit entry of air into said bleed chamber but deflect particulate matter away from said openings.

2. A gas turbine engine as in claim 1 wherein said deflector comprises a continuous band secured to said housing upstream of said holes and extending radially inward and in a downstream direction a sufficient amount to project beyond the openings whereby air passing to said bleed chamber passes through an aft facing opening.

3. A gas turbine engine as in claim 1 wherein said deflector comprises a plurality of chutes secured to said housing around each of said holes, said chutes having a base secured to said housing and triangular-shaped side walls projecting inward and a wall extending between the side walls to a opening through which air must pass in an upstream direction before passing through said openings into said bleed chamber.

4. A gas turbine engine as in claim 1 further comprising a strap connected to the ends of said channel element and extending across said gap to resist hoop stresses imposed on said channel element.

5. A gas turbine engine as in claim 1 further comprising at least one distribution opening positioned in said channel element for connecting the air therein to a utilization device.

6. A gas turbine engine as in claim 1 wherein:
said compressor includes centrifugal impeller directing air radially outward and a diffuser around the periphery of said centrifugal stage for increasing the static pressure of the air;
said combustor is of the reverse flow type in which the head end of the combustor is positioned downstream with respect to the air flowing into the housing around said combustor and the downstream outlet of said combustor is positioned in the upstream end of said housing;
said bleed chamber and said openings are positioned at a point intermediate the ends of said combustor thereby connecting with a point of maximum static pressure in said engine.

* * * * *